March 25, 1941.   F. A. ROBINTON   2,236,069
CAMERA
Filed May 31, 1939   2 Sheets-Sheet 1
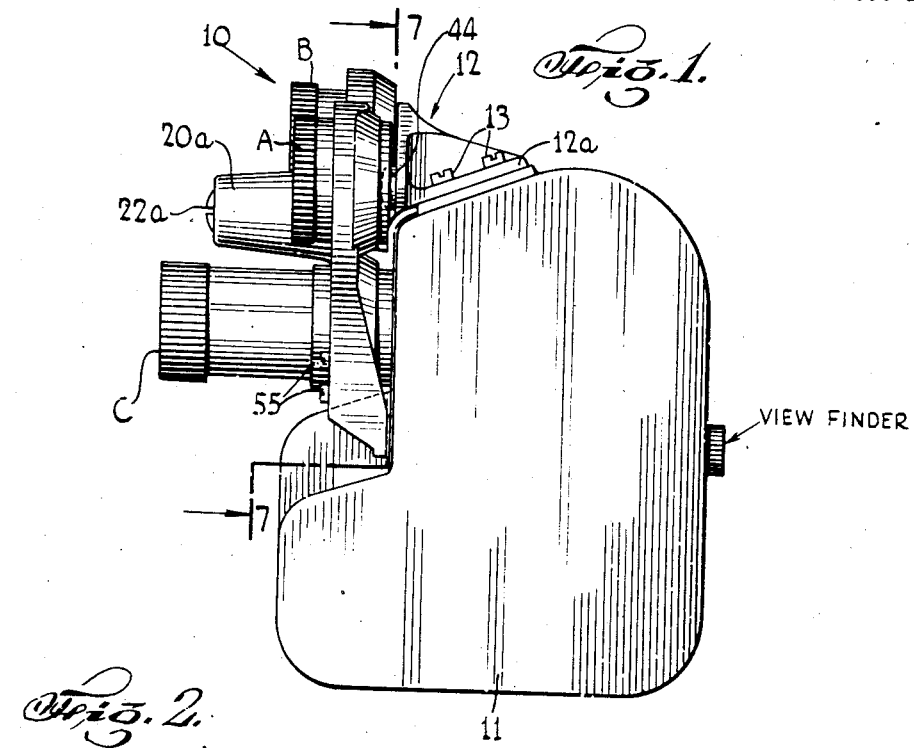
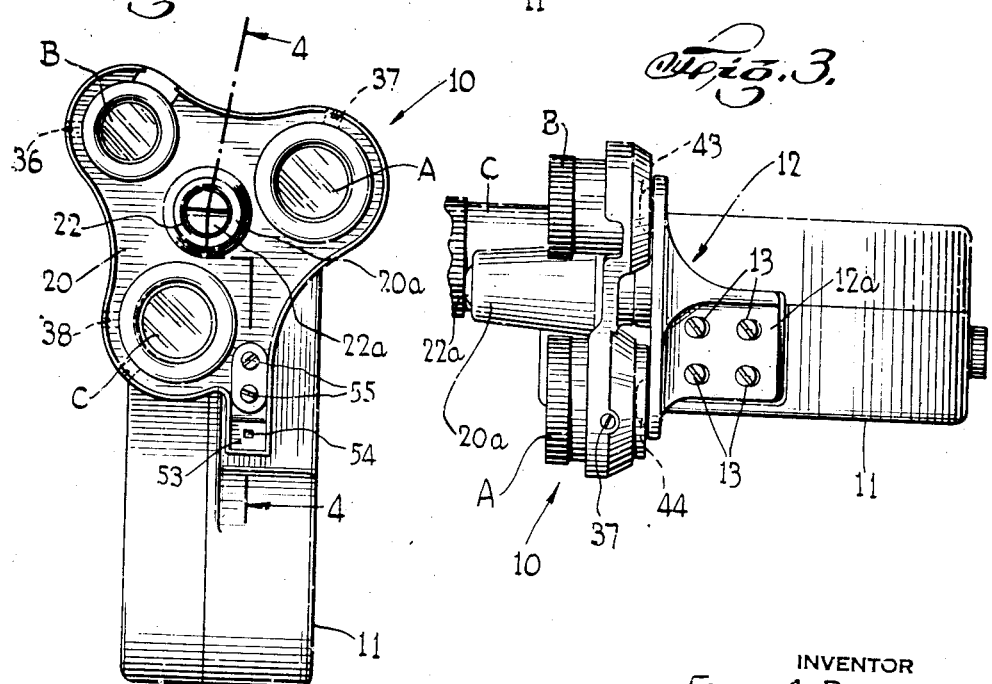
INVENTOR
FRANK A. ROBINTON
BY
ATTORNEY March 25, 1941.　　　F. A. ROBINTON　　　2,236,069
CAMERA
Filed May 31, 1939　　　2 Sheets-Sheet 2
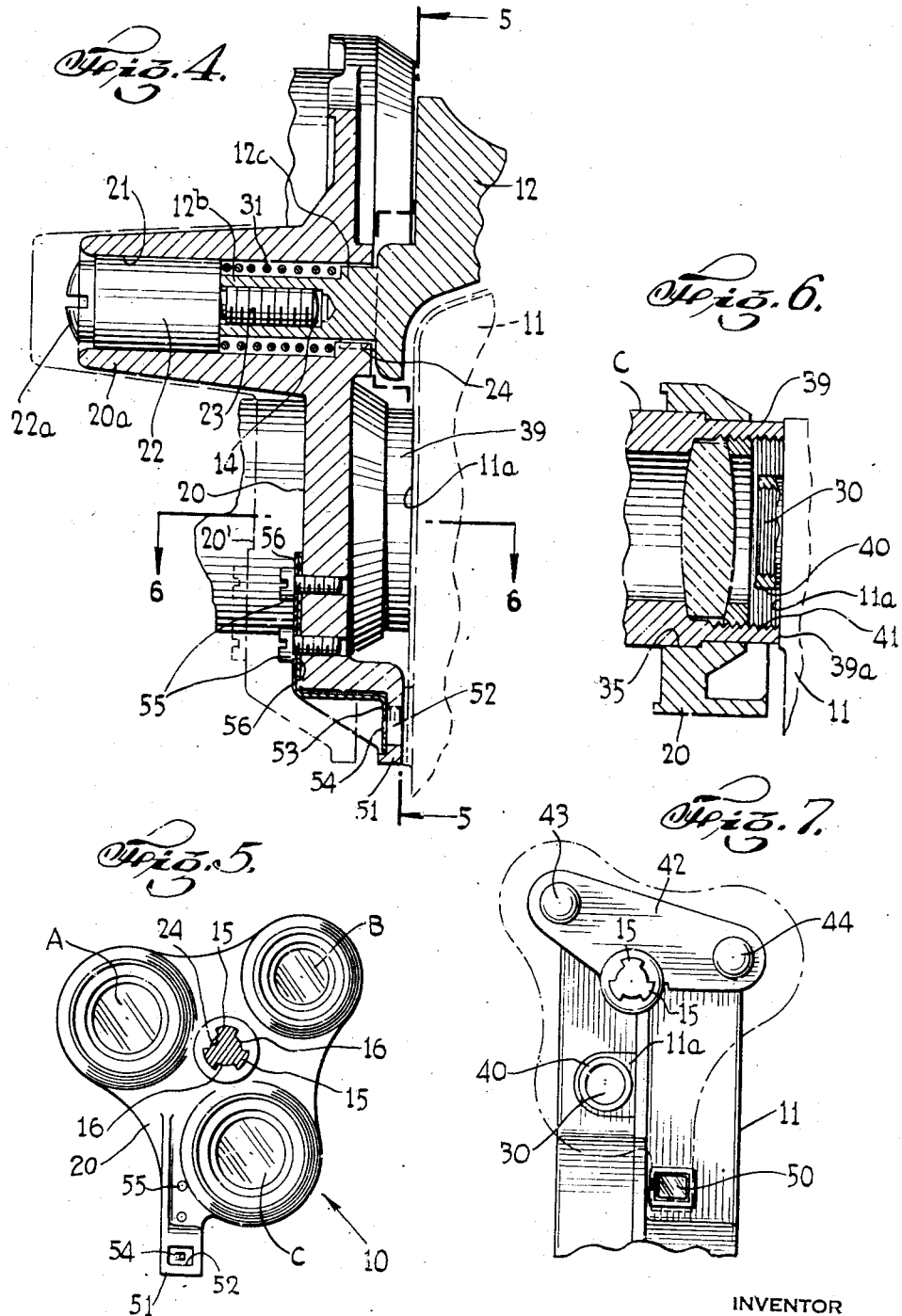
INVENTOR
FRANK A. ROBINTON
BY
ATTORNEY Patented Mar. 25, 1941

2,236,069

UNITED STATES PATENT OFFICE 2,236,069

CAMERA

Frank A. Robinton, Hartford, Conn., assignor to Universal Camera Corporation, New York, N. Y., a corporation of Delaware Application May 31, 1939, Serial No. 276,639

6 Claims. (Cl. 95—44)

This invention relates generally to cameras. More particularly, my invention relates to an improved construction of a multiple lens mount for cameras.

One of the objects of my invention is to provide an improved multiple lens mount of the character described, adapted to be attached to a camera, which shall be so designed that a rapid change may readily be made from one type of lens to another type.

Another object of my invention is to provide a novel multiple lens mount of the character described, adapted to be attached to a camera, which shall comprise relatively few and simple parts, which shall be easy to assembly, which shall be economical in manufacture, which shall be rugged in construction while still maintaining accuracy, and which at the same time shall operate with a high degree of efficiency.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible embodiments of this invention, Fig. 1 is a side elevational view of a camera with my novel turret lens mount attached thereto, in accordance with my invention, Fig. 2 is a front elevational view thereof, Fig. 3 is a plan view thereof, Fig. 4 is an enlarged cross sectional view taken substantially on the line 4—4 of Fig. 2, Fig. 5 is a cross sectional view taken substantially on the line 5—5 of Fig. 4, but of reduced scale, Fig. 6 is a cross sectional view taken substantially on the line 6—6 of Fig. 4, and Fig. 7 is a cross sectional view taken substantially on the line 7—7 of Fig. 1.

Referring now in detail to the drawings, I have disclosed a turret lens mount 10 constructed in accordance with my invention and adapted to be attached to a camera of any suitable type, such as for example the camera 11. The turret mount 10 is designed to support a plurality of camera lenses, A, B and C. The said lenses A, B and C may be of any desired known type, such as for example A may represent a general purpose lens of standard focal length for the particular camera employed, B, a wide angle lens or any other desired type of lens, and C, a telephoto or long focus lens. It is noted that other types and styles of lens may be employed in place of the lens A, B and C and that my invention extends to such use.

The turret mount 10 comprises a bracket member 12 having a part 12a thereof overlying a portion of a wall of the camera 11 and fixedly attached thereto by any suitable attaching means, such as for example the screws 13, as shown in Figs. 1 and 3. The bracket member 12 is also provided with an integral outwardly projecting shaft portion 12b, the said shaft portion having an internally threaded opening 14 extending inwardly from the free end thereof. A portion 12c of the said shaft 12b spaced from the end thereof is provided with circumferentially spaced projecting equal teeth 15 (see Figs. 5 and 7), interconnected by equal notch portions 16. A turret frame 20 is provided having an outwardly projecting bearing portion 20a. The said portion 20a is provided with an opening 21 in axial alignment with the opening 14 of the shaft portion 12b, and designed to slidably receive therein a plug member 22 having a screw threaded shank 23 of reduced diameter threadedly received in the threaded opening 14. The wall of the opening 21 adjacent the inner end thereof is provided with inwardly projecting, circumferentially spaced equal tooth portions 24 adapted to selectively fit into any of the notches 16 of the shaft portion 12c, to form a spline connection between the shaft 12b and the turret member 20.

It is thus seen from the above described construction that when the plug member shank 23 is threadedly received in the opening 14, the turret frame 20 will be held captively attached to the bracket 12, and that the distance to which the turret frame 20 may be slidably moved away from the bracket member 12 is defined by the teeth 24 and the inner edge of the plug member 22.

To normally urge the turret frame 20 in a direction toward the camera 11 and at the same time to provide a resilient contactive engagement for the inner end of the selected lens with the camera wall adjacent the light opening 30 (see Fig. 7) I provide a coil compression spring 31 in the opening 21, surrounding the shaft portion 12b and having one end of the spring abutting the teeth 24 and the other end of the said spring pressing against the plug member 22. The plug member 22 may be provided with a screw head 22a to adjust the amount of tension exerted by the spring 31, by causing the threaded shank 23 to move inwardly or outwardly of the opening 14.

It is also seen from the above described construction that when the teeth 24 are engaged in the notches 16 (see Figs. 4 and 5) the turret frame 20 will be prevented from rotational movement about the plug member 22 as an axis. The turret portion 20 may, however, by slidably moved in an axial direction with respect to the opening 21 and away from the bracket 12 against the action of the spring 31, to the dotted line position 20' shown in Fig. 4. In such position the teeth 24 will have moved clear of the notches 16 and the turret frame 20 may then be freely rotated. When the turret frame 20 is released after a predetermined period of rotation, it will spring back to its original or normal position, as shown in full lines in Fig. 4, and be held against further rotational movement by the teeth 24 meshing with the projections 15.

As clearly shown in Figs. 2, 5 and 6, the turret frame 20 is provided with openings 35 designed to receive the lenses A, B and C. Any suitable fastening means may be employed for retaining the lenses A, B and C in fixed assembly with the turret mount 20, as for example the set screws 36, 37 and 38. It is noted that the centers of the said openings 35 are equidistant from the axis of the plug member 21 about which the turret frame 20 rotates. Such distance or radius is determined by the fixed location of the camera light aperture 30, so that upon rotational movement of the turret frame 20, as hereinabove described, any lens A, B or C may be selectively properly positioned with respect to the said camera aperture 30.

In Fig. 6 of the drawings, the long focus lens C is shown mounted in the turret mount opening 35. It is noted that a portion 39 thereof projects beyond said opening in a direction toward the camera 11, and that camera lens mount 40 surrounding the light aperture 30 is of such diameter that it will fit freely within the adjacent opening 41 of the lens C, there being a clearance provided between the outer wall of the camera mount 40 and the threaded wall of the opening 41. The end surface 39a of the lens C is smoothly finished and the surface 11a of the camera wall surrounding the camera lens mount 40 is correspondingly smoothly finished to provide a light proof frictional contact between the said finished surfaces. It is therefore seen that when the turret frame 20 is rotated so that the lens C is in proper position for effective use, the spring 31 will cause the lens C to snap into proper position over the camera lens mount 40 and to be resiliently retained in such position.

In order to facilitate such proper positioning of the lens, an integral portion 42 of the bracket 12 is provided with a pair of fixed convex projections 43 and 44 (see Fig. 7), which are so positioned that when the lens C is effectively aligned with respect to the camera mount 40, the projection 43 will be received within the rear opening of the lens A (Fig. 5), while at the same time the projection 44 will enter the rear opening of the lens B. Similarly, when either of the lenses A or B are effectively positioned, the two remaining lenses will receive the projections 43 and 44. There is thus provided also protective covering for the lens opening.

While in Fig. 6 of the drawings I have illustrated the mounting of the lens C, it is to be understood that the other lens A and B are similarly mounted and used, and that the clearance between the walls 40 and 41 will be correspondingly reduced in proportion to the smaller sized lens openings.

When using a long focus lens of the type of the lens C, the standard view finder opening 50 in the camera, which is suitably designed for the other lenses A and B, will not be correct for the long focus lens. In accordance with my invention, I have therefore provided the following construction which will automatically alter the view finder opening 50 whenever the lens C is effectively positioned for use.

A portion 51 of the turret frame 20, projecting downwardly and inwardly toward the camera, is provided with an opening 52 designed to overlie and be in register with the camera view finder opening 50 (see Figs. 4 and 7) when the lens C has been positioned over the camera lens mount 40. Overlying the opening 52 is a plate 53 provided with an aperture 54 of smaller size than the opening 52, but in axial registration therewith.

It is thus seen that when the camera operator looks through the camera view finder when using the lens C, he will be looking through the constricted opening 54, which is of predetermined size, in accordance with the focus of the lens C.

The plate 53 may be removably mounted on the turret mount casting 20 by any suitable means, such as the screws 55, so that plates having different sized openings may be employed with different lenses. Openings 56 in the plate 53 through which the screws 55 pass are made larger than the said screws, so that the aperture 54 may be adjusted and centered with respect to the openings 50 and 52 by moving the plate 53.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. For use with a camera, a lens mount comprising a first member adapted to be fixedly attached to said camera, a second member rotatably mounted on said first member, a plurality of lenses mounted on said second member, means for resiliently urging said second member in a direction toward said camera whereby one of said lenses selected for effective use by rotating said second member may be resiliently maintained in proper optical alignment with the camera aperture, means comprising a splined connection between said first and second members for preventing rotational movement of said second member when said selected lens is thus properly aligned, said second member being movable away from said first member against the action of said resilient means to render said rotational movement preventing means ineffective, and projections on said first member so constructed and arranged as to be received within and to protectively cover the ends of the unselected lens.

2. For use with a camera, a lens mount comprising a first member adapted to be fixedly attached to said camera, said first member having a projecting shaft portion and a shoulder adjacent said shaft portion, a second member, three lenses axially slidably mounted on said second member, said lenses being arranged in triangular formation, said second member having a bearing portion receiving said projecting shaft portion therein whereby said second member is rotatable and slidable with respect to said first member, circumferentially arranged projections on said shaft adapted to be received in corresponding circumferential recesses in said bearing portion to prevent rotation of said second member, and a spring urging said second member toward said first member to normally maintain said projections within said recesses, a projecting portion on said bearing being adapted to cooperate with said shoulder on said first member to act as a limit for the travel of said second member toward said first member, said spring being so arranged that one of said lenses may be selected for effective use by slidably moving said second member away from said first member against the action of said spring a sufficient distance to withdraw said second member projections out of their corresponding recesses to permit rotational movement of said second member.

3. For use with a camera, a lens mount comprising a first member adapted to be fixedly attached to said camera, a second member rotatably mounted on said first member, a plurality of lenses mounted on said second member, means for resiliently urging said second member in a direction toward said camera whereby one of said lenses selected for effective use by rotating said second member may be resiliently maintained in proper optical alignment with the camera aperture, and means comprising a splined connection between said first and second members for preventing rotational movement of said second member when said selected lens is thus properly aligned, said second member being movable away from said first member against the action of said resilient means to render said rotational movement preventing means ineffective.

4. For use with a camera, a lens mount comprising a first member adapted to be fixedly attached to said camera, a second member rotatably mounted on said first member, a plurality of lenses mounted on said second member, means for resiliently urging said second member in a direction toward said camera whereby one of said lenses selected for effective use by rotating said second member may be resiliently maintained in proper optical alignment with the camera aperture, and means comprising a splined connection between said first and second members for preventing rotational movement of said second member when said selected lens is thus properly aligned, the number of splines in said connection being a multiple of the number of lenses on said second member, said second member being movable away from said first member against the action of said resilient means to render said rotational movement preventing means ineffective.

5. For use with a camera, a lens mount comprising a first member adapted to be fixedly attached to said camera, said first member having a projecting shaft portion and a shoulder adjacent said shaft portion, a second member, a plurality of lenses mounted on said second member, said second member having a bearing portion receiving said projecting shaft portion therein whereby said second member is rotatable and slidable with respect to said first member, the optical axes of said lenses being equi-spaced from the center of rotation of said second member, circumferentially arranged projections on said shaft adapted to be received in corresponding circumferential recesses in said bearing portion to prevent rotation of said second member, and a spring urging said second member toward said first member to normally maintain said projections within said recesses, a projecting portion on said bearing being adapted to cooperate with said shoulder on said first member to act as a limit for the travel of said second member toward said first member, said spring being so arranged that one of said lenses may be selected for effective use by slidably moving said second member away from said first member against the action of said spring a sufficient distance to withdraw said second member projections out of their corresponding recesses to permit rotational movement of said second member.

6. For use with a camera having a built-on view finder, a lens mount comprising a first member adapted to be fixedly attached to said camera, a second member rotatably mounted on said first member, a plurality of lenses mounted on said second member, means for resiliently urging said second member in a direction toward said camera whereby one of said lenses selected for effective use by rotating said second member may be resiliently maintained in proper optical alignment with the camera aperture, means comprising a splined connection between said first and second members for preventing rotational movement of said second member when said selected lens is thus properly aligned, said second member being movable away from said first member against the action of said resilient means to render said rotational movement preventing means ineffective, and a mask blade carried by said second member, said mask blade being so positioned as to automatically mask the view finder whenever a predetermined one of said lenses is positioned for effective use.

FRANK A. ROBINTON.